Feb. 20, 1940. W. ASHENDORF 2,191,304
HANDLE REPLACEMENT FOR VALVE STEMS
Filed May 6, 1939
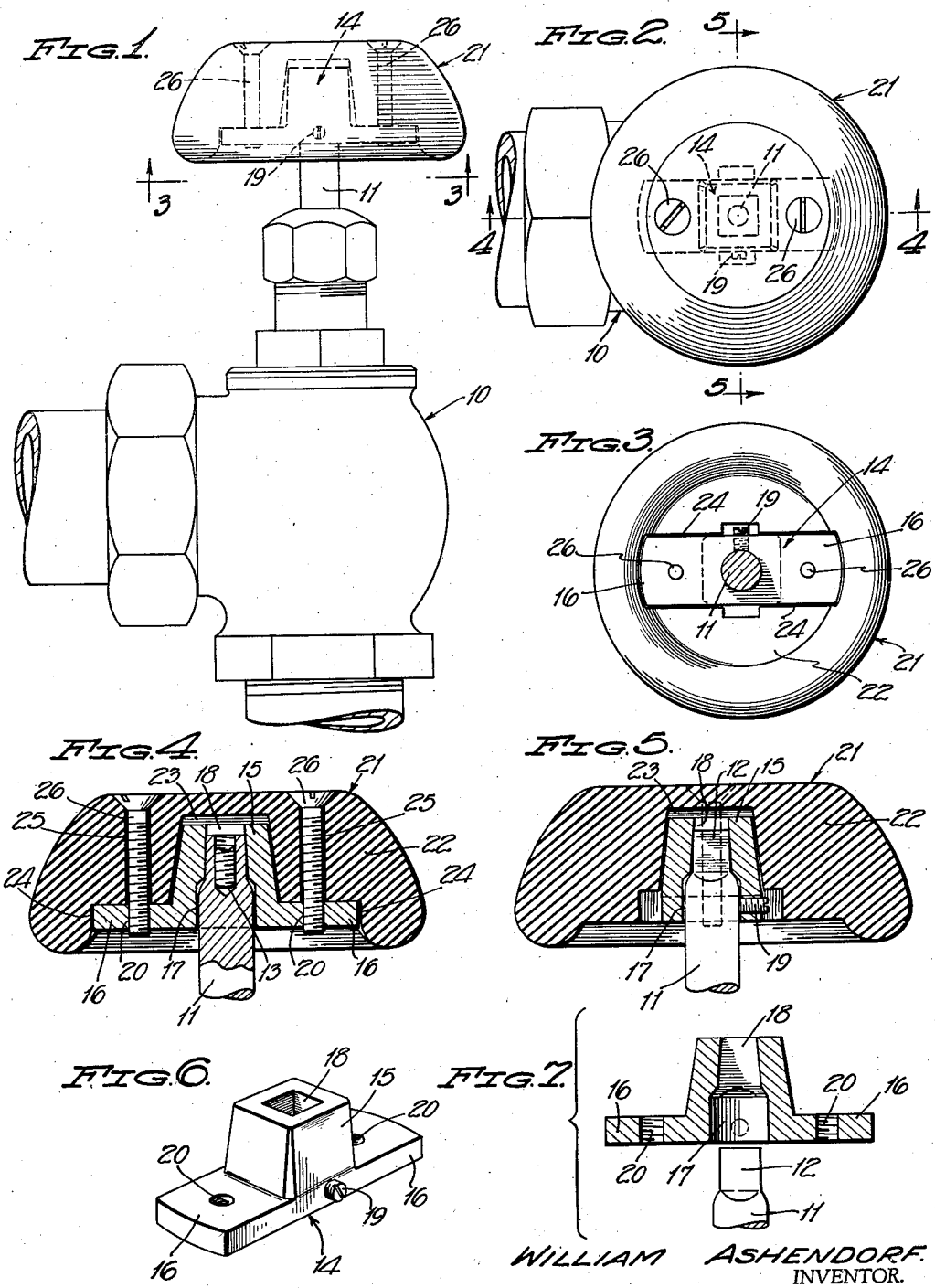
WILLIAM ASHENDORF
INVENTOR.
BY Ely & Pattison
ATTORNEYS.

Patented Feb. 20, 1940

2,191,304

UNITED STATES PATENT OFFICE 2,191,304

HANDLE REPLACEMENT FOR VALVE STEMS

William Ashendorf, Brooklyn, N. Y.

Application May 6, 1939, Serial No. 272,206

2 Claims. (Cl. 16—117)

This invention relates to improvements in handles for valve stems and more particularly to a replacement handle therefor.

Steam valve handles, faucet handles, and the like are usually connected to the end of a valve stem by a screw which is passed through the handle and threads into the outer end of the stem axially thereof. It is a common practice for handle fastening screws of a steam or hot water radiator valve to break off in the threaded bore of the valve stem which requires drilling to clear the threaded bore and re-threading of the bore to effect a replacement of the handle. This method of repair is expensive in view of the labor required, and the other alternative is to replace the broken valve by a new one which is also costly due to the cost of a new valve and the labor required in disconnecting the broken valve and installing the new one. It is therefore the primary object of this invention to expeditiously and inexpensively replace a handle upon a valve stem when the original fastening means is rendered useless by the conditions set forth above.

Another feature of the invention resides in a handle replacement for valves which may be sold in hardware and other stores for a nominal cost, and installed upon a valve stem in lieu of a broken original handle, by any one unskilled in the art of plumbing and steam fitting repair.

Other features of the invention will be appreciated as the following specification is read in conjunction with the accompanying drawing, in which:

Figure 1 is a side elevational view of a steam or hot water valve equipped with my replacement handle.

Figure 2 is a top plan view.

Figure 3 is a horizontal sectional view on the line 3—3 of Figure 1, looking in the direction of the arrows.

Figure 4 is an enlarged vertical sectional view on the line 4—4 of Figure 2.

Figure 5 is an enlarged vertical sectional view on the line 5—5 of Figure 2.

Figure 6 is a detail perspective view of the coupling member per se.

Figure 7 is a vertical longitudinal sectional view through the coupling member as it appears before being fitted to the top end of a valve stem.

Referring to the drawing by reference characters, the numeral 10 designates a steam or hot water valve provided with the usual rotatable valve stem 11. The upper end of the valve stem 11 is square as at 12, and is usually provided with a threaded recess 13 extending inwardly from the square outer end thereof. Ordinarily, the hand grip of the valve is attached to the stem 11 by a screw which passes centrally through the hand grip and threads in the recess 13. It is not uncommon for the fastening screws to break off in the recess, and in Figure 4 a portion of a broken screw has been shown in the recess 13. My invention now to be described is intended for use in securing handle replacements to the valve stem when a condition such as explained occurs.

My improved handle replacement includes a coupling member 14 which is preferably made of malleable metal such as brass and comprises a square upwardly tapered body 15 and formed integral with the body 15 and extending from opposite sides thereof are flat ears 16—16. The body 15 is provided with an opening which extends entirely therethrough, the lower portion 17 of the opening being round in cross section so as to receive the upper round portion of the valve stem 11, while the upper portion of the opening is square in cross section and is designated 18, the opposed walls of the square portion 18 converging upwardly as best illustrated in Figure 7 of the drawing and which square portion is intended to receive the squared portion 12 of the valve stem 11. Threaded into one side of the body 15 adjacent the base thereof, is a set screw 19, the set screw entering the opening at the round portion 17 and adapted to engage the upper round portion of the valve stem 11. The ears 16—16 are provided with threaded openings 20—20.

Attachable to the coupling member 14 is a handle member 21 which comprises a hand grip body 22 preferably constructed of a composition of material having a low heat absorption, and which may be in the form of Bakelite, wood, hard rubber, or the like. The hand grip body 22 is provided with a relatively deep central recess 23 which opens through the under side of the body and is of a shape complementary to the shape of the body 15 of the coupling member 14. The under side of the body 22 at opposite sides of the recess 23 is provided with shallow recesses or countersinks 24—24 which are complementary to the ears 16—16, whereby the handle member 21 may be fitted snugly upon the coupling member 14.

When effecting an attachment of my handle replacement to the valve stem 11, the operator first applies the coupling member 14 over the top square end 12 of the valve stem 11, but due to the tapered square portion 18 of the opening in the body 15, the square portion 12 will not fully enter the square portion 18 unless the operator applies a striking blow to the top of the body 15 of the coupling member, thus forcing the coupling member down onto the stem 11 with the rounded portion 17 of the opening fitting about the rounded portion of the valve stem and with the square portion 18 of the opening receiving the squared end 12 of the valve stem. The operator next applies the screw driver to the set screw 19 and tightens the same against the valve stem 11, thus completely effecting a fixed attachment of the coupling member 14 to the upper end of the valve stem 11. The operator next applies the handle member 21 over the coupling member 14 so that the tapered body 15 snugly fits into the similar shaped recess 23 with the ears 16—16 snugly fitting into the countersinks 24—24. The screw threaded openings 20—20 now aline with screw openings 25—25 which extend from the top of the hand grip body 22 to the counter-sinks 24 and passing through the openings 25—25 are fastening screws 26—26, which have their inner ends threadedly engaging the threaded openings 20—20, while the head ends of the screws are countersunk in the top of the hand grip body 22. It will now be appreciated that rotation may be imparted to the valve stem 11 by grasping the handle member 21 and imparting a turning movement thereto, for the handle member 21 is fixedly attached to the coupling member 14 and the coupling member in turn is fixedly attached to the outer end of the valve stem 11.

Whereas I have illustrated a steam or hot water valve 10, it will be understood that my improved handle replacement may also be used in connection with the valve stems of water faucets. It is also possible to attach my handle replacement to valve stems in which the outer end of the valve stem is screw threaded for the purpose of receiving a handle, and in instances where the screw threads may become stripped. In such case, the threaded end of the valve stem may be filed away to provide the square portion 12.

While I have shown and described what I consider to be the most practical embodiment of my invention, I wish it to be understood that such changes and alterations as come within the scope of the appended claims may be resorted to if desired.

Having thus described the invention, what I claim as new and desire to secure by Letters Patent of the United States, is:

1. A handle attachment for the stems of steam valves and the like comprising a coupling member including an upwardly tapered body which is rectangular in plan having an opening extending therethrough, the walls of the lower portion of said opening being round and the opposed walls of the upper portion thereof being square and converging upwardly to telescope and wedgingly fit upon the outer squared end portion of a valve stem, a set screw threaded in one side of said body adjacent the bottom thereof, opposed flat ears extending from said body at the bottom thereof and having threaded openings therein; a hand grip including a handle body having a recess complementary to the shape of said coupling member and opening through the underside thereof to snugly receive said coupling member, said handle body having openings extending from the top thereof to said recess and registering with the threaded openings in said ears, and screws passing through the openings in the handle body and threaded into the threaded openings in said ears.

2. A handle replacement for the stems of steam valves and the like comprising a coupling member constructed of malleable metal having an opening extending therethrough, the lower portion of said opening being round in cross section to fit about the round portion of a valve stem and the upper portion being square in cross section and upwardly tapered to effect a wedge fit upon the square end of a valve stem, a set screw threaded in one side of said body adjacent the bottom thereof, a hand grip having a recess in the underside thereof which is of a shape and size complementary to said coupling member and fitting thereover, and fastening means for securing said hand grip to said coupling member for turning movement therewith.

WILLIAM ASHENDORF.